(12) United States Patent
Zeitz et al.

(10) Patent No.: US 6,538,067 B1
(45) Date of Patent: Mar. 25, 2003

(54) INTERPOLYMERS

(75) Inventors: Katrin Zeitz, Ludwigshafen (DE); Reinhold Dieing, Schifferstadt (DE); Axel Sanner, Frankenthal (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 09/913,120

(22) PCT Filed: Feb. 5, 2000

(86) PCT No.: PCT/EP00/00916

§ 371 (c)(1), (2), (4) Date: Aug. 9, 2001

(87) PCT Pub. No.: WO00/47631

PCT Pub. Date: Aug. 17, 2000

(30) Foreign Application Priority Data

Feb. 12, 1999 (GB) .............................................. 9903140

(51) Int. Cl.⁷ ........................... C08L 77/12; C08F 20/10
(52) U.S. Cl. ...................... 525/184; 525/190; 525/193; 525/207; 525/221
(58) Field of Search .................................. 525/184, 190, 525/193, 221, 207

(56) References Cited

U.S. PATENT DOCUMENTS

| | | | |
|---|---|---|---|
| 2,798,053 A | * 7/1957 | Brown et al. ................. | 260/2.2 |
| 3,915,921 A | 10/1975 | Schlatzer, Jr. ................ | 260/17 |
| 3,940,351 A | 2/1976 | Schlatzer, Jr. ................ | 260/17 |
| 4,062,817 A | 12/1977 | Westerman .................... | 260/17 |
| 4,066,583 A | 1/1978 | Spaulding .................... | 260/17 |
| 4,267,103 A | 5/1981 | Cohen .......................... | 260/17 |
| 4,375,533 A | 3/1983 | Park et al. ................... | 526/193 |
| 4,419,502 A | 12/1983 | Sehm et al. ................... | 526/209 |
| 4,420,596 A | 12/1983 | Lochhead et al. ............. | 526/212 |
| 4,526,937 A | 7/1985 | Hsu ............................ | 524/724 |
| 4,692,502 A | 9/1987 | Uebele et al. ............... | 526/193 |
| 5,468,797 A | * 11/1995 | Adams et al. | |

FOREIGN PATENT DOCUMENTS

| | | |
|---|---|---|
| EP | 0 408 311 | 1/1991 |
| EP | 0 558 423 | 9/1993 |
| EP | 0 584 771 | 3/1994 |
| WO | WO 96/26229 | 8/1996 |

* cited by examiner

Primary Examiner—James J. Seidleck
Assistant Examiner—Olga Asinovsky
(74) Attorney, Agent, or Firm—Keil & Weinkauf

(57) ABSTRACT

Interpolymer of a polymer of unsaturated olefinically monomers without carboxylic groups and a polymeric surface active agent.

6 Claims, No Drawings

INTERPOLYMERS

BACKGROUND OF THE INVENTION

This invention relates to an interpolymer of a polymer of unsaturated olefinically monomers without carboxylic groups and a polymeric surface active agent (or surfactant), having a linear block or random comb configuration which provides a steric stabilizing component to the interpolymer and produces a polymer which is easier to disperse and handle.

Polymers of vinyl or vinylidene monomers containing at least one terminal CH2=C<group are well known. Such polymers are (like) homopolymers of unsaturated polymerizable carboxylic acids, such as acrylic acid, methacrylic acid, maleic acid, maleic anhydride, itaconic acid and the like; or copolymers of said acid or anhydride monomers with (meth)acrylate esters, (meth)acrylamides, olefins, maleic anhydrides, vinyl esters, vinyl ethers, and styrenics; or copolymers with other vinyl or vinylidene monomers are well known. Often, copolymers of these monomers are cross-linked with small amounts of cross-linking agents. These materials are normally prepared by polymerization with a free-radical catalyst in an organic medium in a closed vessel or autoclave equipped with stirring. During the course of such polymerizations, the polymer begins to precipitate from the solution as it is formed and flocculates and forms aggregates. The precipitated polymer is then recovered and dried to remove residual solvent. The polymer, which is now in a powder form, is used usually by dispersing it in water, neutralizing it, and adding it to a liquid to use its thickening ability. Such polymers are disclosed in U.S. Pat. Nos. 2,798,053; 3,915,921; 3,940,351; 4,062,817; 4,066,583; and 4,267,103.

Surfactants have been employed in the manufacture of carboxyl containing polymers because, in their manufacture, the aggregation of the polymer can interfere with the polymerization reaction by retarding access of the monomer to free radicals and by interfering with the removal of the heat produced by the polymerization. Further, the precipitated polymer forms a slurry in the solvent which becomes extremely thick, resulting in ineffective mixing and fouling on reactor surfaces. In response to these problems, and to increase the usually low total solids to a range of about 8 to 17 weight percent and increase productivity, a variety of surfactants have been employed.

For example, U.S. Pat. No. 4,375,533 to Park et al. discloses a process for overcoming some of the above problems, in which the polymerization of acrylic acid, and optional comonomers, in an organic media, is characterized by the use of nonionic surface active agents having a hydrophobe to lipophobe balance (HLB) values between 1 and about 10. U.S. Pat. No. 4,419,502, to Sehm, disclosed a process for the polymerization of acrylic acid and optional comonomers in the presence of a nonionic surface active agent selected from polyoxyethylene alkyl ethers and polyoxyethylene sorbitol esters and having an HLB value greater than 12. U.S. Pat. No. 4,420,596, to Lochhead et al., disclosed a process for polymerizing carboxylic acids in mineral spirits, employing nonionic surface active agents having HLB values less than 10. U.S. Pat. No. 4,526,937 to Hsu teaches the polymerization of acrylic acid in an organic solvent with a free radical catalyst, using nonionic block copolymers of propylene oxide and ethylene oxide to minimize undesirable flocculation and agglomeration. U.S. Pat. No. 4,692,502 to Uebele et al. Teaches a process for polymerizing acrylic acid in an organic media with a free radical catalyst and at least one oil-soluble ionic surfactant selected from an anionic formular, a cationic formula, or an amphoteric formula to achieve reduced polymer build-up in the reactor and provide a more desirable particle size for the precipitated polymer.

This polymerisation process is also known in inverse phase. In such cases water is used as solubilisation agent for the monomers. After the polymerisation process the water is distilled off.

For basic or cationic polymers such as copolymers of vinylimidazole and vinyllactames, the process is discribed in WO 9626229 (DE 195 05750) (SCHADE; OZ 0050/45643)

EP 584771 describes how in polymerizing olefinically unsaturated carboxylic acid or anhydride monomers containing at least one activated carbon to carbon olefinic double bond and at least one carboxyl group, in an organic media, in the presence of free radical forming catalysts and at least one steric stabilizing polymeric surface active agent (also called surfactant), having at least one hydrophilic moiety and at least one hydrophobic moiety and a linear block or random comb configuration, or mixtures thereof or with other surfactants, produces an interpolymer, useful as a thickening and emulsifying agent, which is easier to handle and to disperse. The carboxylic acid or anhydride will be more than 15% by weight of the interpolymer.

Surprisingly, it has now been found that carboxyl groups are entirely insignificant for the mode of action of the interpolymer and the addition of steric stabilizing polymeric surface active agents shows activity also in the case of cationic and basic and also neutral polymers and leads to readily dispersible polymer powders.

SUMMARY OF THE INVENTION

The polymerisation of olefinically unsaturated monomers containing at least one activated carbon to carbon olefinic double bond and no carboxylic groups, in an organic media, or in inversed phase (water in organic media) in the presence of free radical forming catalysts and at least one steric stabilizing polymeric surface active agent (also called surfactant), having at least one hydrophilic moiety and at least one hydrophobic moiety and a linear block or random comb configuration, or mixtures thereof or with other surfactants, produces an interpolymer, useful as a thickening agent, which is easier to handle and to disperse.

DETAILED DESCRIPTION

In accordance with the present invention, one is able to obtain an improved interpolymer which is easy to disperse and to handle, and yields lower dispersion viscosities, combined with favorable final application properties such as increased thickening efficiency This product is achieved using a steric stabilizing surfactant (or steric stabilizer) which becomes associated with the resin in the final product as an interpolymer.

In detail the present intention releates to an interpolymer of (1)
  (a) at least one olefinically unsaturated monomer without carboxylic groups containing at least one activated carbon-to-carbon olefinic double bond and
  (b) 0.001 to 10% by weight of a crosslinking monomer containing at least two ethylenically unsaturated groups, and
(2) 0.001 to 20% by weight based upon the weight of the monomers (a) of at least one steric stabilizer having at least one hydrophilic moiety and at least one hydrophobic moiety, selected from the group consisting of linear block copolymeric steric stabilizers, having a hydrophobic moiety having a length of more than 5 nm (50 Angstroms) (as calculated by the Law of Cosines) and being defined by the following formula

$$C_w-(B-A-B_y)_x D_z$$

wherein
- A is a hydrophilic moiety having a solubility in water at 25° C. of 1% or greater, a molecular weight of from 200 to 50,000, and selected to be covalently bonded to B;
- B is a hydrophobic moiety having a molecular weight of from 300 to 60,000, a solubility of less than 1% in water at 25° C., capable of being covalently bonded to A;
- C and D are terminating groups which can be A or B, can be the same or different groups, w is 0 or 1;
- x is an integer of 1 or more,
- y is 0 or 1, and
- z is 0 or 1, random copolymeric comb steric stabilizers, being defined by the following formula:

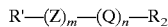

$$R'-(Z)_m-(Q)_n-R_2$$

where
- R' and $R_2$ are terminating groups different from Z and Q,
- Z is a hydrophobic moiety having a solubility of less than 1% in water at 25° C.,
- Q is a hydrophilic moiety, having a solubility of more than 1% in water at 25° C., and
- m and n are integers of 1 or more, and are selected such that the molecular weight is from 100 to 250,000, and mixtures thereof.

The steric stabilizer may also be used in combination with other surfactants. The amount of steric stabilizing surfactant used in an amount of between 0.01 to 10% is preferred, and 0.2 to 6.0% is further preferred, based upon the weight of the olefinically unsaturated carboxylic acids or anhydrides, to be polymerized.

Polymerization of the non carboxyl-containing monomers, optionally with other vinylidene comonomers, is usually carried out in the presence of a free-radical catalyst in a closed vessel in an inert atmosphere under autogenous or artificially-induced pressure, or in an open vessel in an inert atmosphere optionally under reflux at atmospheric pressure. The polymerization can also be carried out as inverse emulsion polymerization or suspension polymerization. Here, the monomers, dissolved in water, are initially introduced, and the aqueous phase is stabilized with the abovementioned emulsifiers. Following polymerization, the aqueous phase is distilled off azeotropically and the powder is present in the organic phase. The temperature of the polymerization may be varied from 0° to 125° C. or lower or higher. Polymerization at 25° to 90° C. using a free radical catalyst is generally effective in providing monomer to polymer conversions of 75 percent to 100 percent.

In the practice of the invention, the polymerizations may be either batch, semi-batch or continuous. The agitation may be any agitation sufficient to maintain the slurry and obtain effective heat transfer including, for example, helical agitation, pitched turbines and the like. A useful reaction temperature range is from the range of 20° C. to 90° C. at 101.3 kPa (1 atmosphere) or more. Normal polymerization times are from 3 to 12 hours.

Initiators which can be used for the free-radical polymerization may be water-soluble or water-insoluble peroxo and/or azo compounds, for example alkali metal or ammonium peroxodisulfates, hydrogen peroxide, dibenzoyl peroxide, caprylyl peroxide, benzoyl peroxide, hydrogen peroxide, pelargonyl peroxide, cumene hydroperoxides, diisopropyl peroxydicarbonate, tert-butyl perpivalate, tert-butyl per-2-ethylhexanoate, di-tert-butyl peroxide, tert-butyl hydroperoxide, azobisisobutyronitrile, azobis(2-amidinopropane) dihydrochloride or 2,2'-azobis(2-methylbutyronitrile). Also suitable are initiator mixtures or redox initiator systems, for example ascorbic acid/iron(II) sulfate/sodium peroxodisulfate, tert-butyl hydroperoxide/sodium disulfite, tert-butyl hydroperoxide/sodium hydroxymethanesulfinate. The initiators can be used in customary amounts, for example 0.05 to 7% by weight, based on the amount of monomers to be polymerized.

The co-use of redox co-initiators, for example benzoin, dimethylaniline and organically soluble complexes and salts of heavy metals, such as copper, cobalt, manganese, iron, nickel and chromium, enables the half-life of said peroxides, in particular the hydroperoxides, to be reduced, so that, for example, tert-butyl hydroperoxide in the presence of 5 ppm of copper(II) acetylacetonate is already effective at 100° C. Ultraviolet light may also be used to generate free radicals. Some systems polymerize solely by heat, but catalysts generally provide better control. The monomers may be batch charged or continuously added during the course of polymerization or by any other manner of polymerization techniques conventionally used.

The precipitation polymerization described herein is normally conducted in inert diluents that have a solubilizing effect on one or more of the monomeric ingredients but substantially no effect on the resulting polymers. In other words, the medium used for the polymerization is an organic fluid, or mixtures of organic fluids, in which the monomers are preferably soluble but in which the polymer is substantially insoluble, so that the polymer product is preferably obtained as a fine friable or fluffy pre-cipitate. Generally the organic media is selected from the group consisting of hydrocarbons containing 6 to 40 carbon atoms, halocarbons, chlorofluoralkanes, esters, and ketones. Typical monomer solvents include liquid hydrocarbons selected from alkanes of 5 to 10, preferably 6 to 8 carbon atoms, such as hexane and heptane; cycloalkanes of 4 to 8, preferably 5 to 7 carbon atoms, such as cyclohexane; benzene and alkyl-substituted benzenes containing 1 to 2 lower alkyl substituents, preferably methyl substituents, such as toluene and xylene; alkyl carboxylates containing 1 to 6 preferably 1 to 4 carbon atoms in the alkyl groups and 2 to 6, preferably 2 to 4 carbon atoms in the carboxylate moiety, such as ethyl acetate, isopropyl acetate, isopropyl acetate, propyl acetate, methyl acetate, and butyl acetate; haloalkanes and chlorofluoroalkanes, containing 1 to 3 carbon atoms and at least 2 halo groups, such as methylene chloride, ethylene dichloride, and 1,1,1-trichloroethane; ketones; and mineral spirits with a flash point greater than about 130° C., mineral oil, or mixtures thereof.

The amount of organic liquid solvent, such as benzene, used normally will be in excess of the components to be polymerized and the proportion may vary from at least 1 weight percent of the components and 99 percent of solvent up to 65 weight percent of polymerizable components and 35 weight percent of solvent. More normally, a concentration of 10 to 60 percent of components is employed, where the weight percent is based on the total amount of ingredients charged to the vessel. In the present application, a concentration of 10 to 50 percent, based upon the vinylic monomers is preferred.

If inverse polymerization methods are used, water-insoluble organic media are used. Suitable solvents are all those which are miscible with water below 5% at a temperature of 25° C.

Examples of suitable solvents are silicones, aliphatic, aromatic or chlorinated hydrocarbons have a boiling range from 40 to 200° C. The preferred hydrocarbons are pentane, hexane, cyclohexane, heptane, octane, isooctane, methylcyclohexane, toluene, xylene or mixtures of said hydrocarbons. Preference is given to using hydrocarbons having a boiling range from 50 to 150° C. The oil phase of the water-in-oil polymer suspension is in most cases, for example, 30 to 90% by weight, based on the overall emulsion.

For the polymerization, where appropriate, it is possible to co-use those emulsifiers customarily used in inverse suspension polymerization or inverse emulsion polymerization. These are, for example, water-in-oil emulsifiers from the group of esters of $C_8$- to $C_{22}$-carboxylic acids with glycerol, sorbitan, sucrose, polyglycerol or the correspondingly ethoxylated alcohols, where up to 80 mol of ethylene oxide is added per mole of the alcohols.

Examples of suitable emulsifiers are sorbitan monopalmitate, sorbitan monostearate, sorbitan monooleate. Furthermore, if appropriate, it is possible to work with a wetting agent having a HLB value of >10, which additionally can be used in amounts up to 10% by weight, based on the overall emulsion.

Suitable polymerizable monomers (a) which may be used are preferably ethylenically unsaturated monomers. It is possible to use either a single monomer or combinations of two or more monomers. Polymerizable is taken to mean that the monomers used can be polymerized using any conventional synthetic method.

For example, this may be solution polymerization, emulsion polymerization, inverse emulsion polymerization, suspension polymerization, inverse suspension polymerization or precipitation polymerization, although the methods which may be used are not limited thereto.

Monomers which can be polymerized using a reaction initiated by free radicals are preferred. The term ethylenically unsaturated means that the monomers have at least one polymerizable carbon-carbon double bond which can be mono-, di-, tri-, or tetrasubstituted.

The preferred ethylenically unsaturated monomers (a) can be described by the following formula:

$$X-C(O)CR^7=CHR^6$$

where

X is chosen from the group of radicals $-OR^8$, $NH_2$, $-NHR^8$, $N(R^8)_2$;

the radicals $R^8$ can be identical or different and are chosen from the group consisting of $-H$, C1–C40 linear or branched-chain alkyl radicals, N,N-dimethylaminoethyl, 2-hydroxyethyl, 2-methoxyethyl, 2-ethoxyethyl, hydroxypropyl, methoxypropyl or ethoxypropyl.

$R^7$ and $R^6$ are independently of one another chosen from the group consisting of: $-H$, C1–C8 linear or branched-chain alkyl chains, methoxy, ethoxy, 2-hydroxyethoxy, 2-methoxyethoxy and 2-ethoxyethyl.

Representative but nonlimiting examples of suitable monomers (a) are, for example, esters and amides of (meth) acrylic acid. The esters can be derived from C1–C40 linear, C3–C40 branched-chain, or C3–C40 carbocyclic alcohols; from polyfunctional alcohols having 2 to about 8 hydroxyl groups (such as ethylene glycol, hexylene glycol, glycerol, and 1,2,6-hexanetriol); from aminoalcohols or from alcohol ethers (such as methoxyethanol and ethoxyethanol or polyethylene glycols).

Other suitable monomers are N,N-dialkylaminoalkyl acrylates and methacrylates and N,N-dialkylaminoalkylacrylamides and methacrylamides of the formula (II)

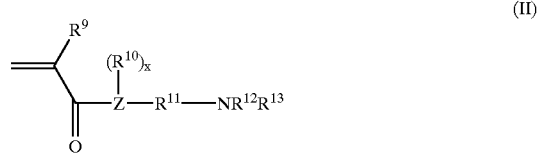

(II)

where $R^9$=H, alkylene having 1 to 8 carbon atoms, $R^{10}$=H, methyl, $R^{11}$=alkylene having 1 to 24 carbon atoms, optionally substituted by alkyl, $R^{12}$, $R^{13}$=C1–C24 alkyl radical, Z=nitrogen where x=1, or oxygen where x=0.

The amides can be unsubstituted, N-alkyl- or N-alkylamino-monosubstituted, or N,N-dialkyl-substituted or N,N-dialkylamino-disubstituted, where the alkyl or alkylamino groups are derived from C1–C40 linear, C3–C40 branched-chain, or C3–C40 carbocyclic units In addition, the alkylamino groups can be quaternized.

Preferred monomers of the formula II are N,N-dimethylaminomethyl (meth)acrylate, N,N-diethylaminomethyl (meth)acrylate, N,N-dimethylaminoethyl (meth)acrylate, N,N-diethylaminoethyl (meth)acrylate.

Other monomers (a) which can be used are salts, esters and amides of substituted (meth)acrylic acids, the substituents on the carbon atoms being in the two- or three-position of the acrylic acid, and independently of one another being chosen from the group consisting of C1–C4 alkyl, $-CN$. These esters and amides of the substituted acrylic acids can be chosen as described above for the esters and amides of acrylic acid.

Other suitable monomers (a) are vinyl and allyl esters of C1–C40 linear, C3–C40 branched-chain or C3–C40 carbocyclic carboxylic acids (e.g.: vinyl acetate, vinyl propionate, vinyl neononanoate, vinyl neoundecanoic acid or vinyl t-butylbenzoate); vinyl or allyl halides, preferably vinyl chloride and allyl chloride, vinyl ethers, preferably methyl-, ethyl-, butyl-, or dodecyl vinyl ethers, vinylformamide, vinylmethylacetamide, vinylamine; vinyllactams, preferably vinylpyrrolidone and vinylcaprolactam, vinyl- or allyl-substituted heterocyclic compounds, preferably vinylpyridine, vinyloxazolione and allylpyridine.

Also suitable are N-vinylimidazoles of the formula III, where $R^{14}$ to $R^{16}$ independently of one another are hydrogen, $C_1$–$C_4$-alkyl or phenyl:

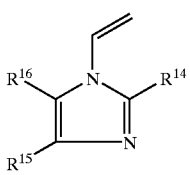

Other suitable monomers (a) are diallylamines of the formula (IV)

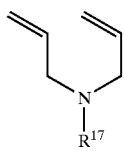

where $R^{17}$=C1 to C24 alkyl.

Other suitable monomers (a) are vinylidene chloride; hydrocarbons having at least one carbon-carbon double bond, preferably styrene, alpha-methylstyrene, tert-butylstyrene, butadiene, isoprene, cyclohexadiene, ethylene, propylene, 1-butene, 2-butene, isobutylene, vinyltoluole, and mixtures of these monomers.

Particularly suitable monomers (a) are methyl acrylate, ethyl acrylate, propyl acrylate, n-butyl acrylate, isobutyl acrylate, t-butyl acrylate, 2-ethylhexyl acrylate, decyl acrylate, methyl methacrylate, ethyl methacrylate, propyl methacrylate, n-butyl methacrylate, isobutyl methacrylate, t-butyl methacrylate, 2-ethylhexyl methacrylate, decyl methacrylate, methyl ethacrylate, ethyl ethacrylate, n-butyl ethacrylate, isobutyl ethacrylate, tert-butyl ethacrylate, 2-ethylhexyl ethacrylate, decyl ethacrylate, 2,3-dihydroxy propylacrylate, 2,3-dihydroxypropyl methacrylate, 2-hydroxyethyl acrylate, hydroxypropyl acrylates, 2-hydroxyethyl methacrylate, 2-hydroxyethyl ethacrylate, 2-methoxyethyl acrylate, 2-methoxyethyl methacrylate, 2-methoxyethyl ethacrylate, 2-ethoxyethyl methacrylate, 2-ethoxyethyl ethacrylate, hydroxypropyl methacrylates, glyceryl monoacrylate, glyceryl monomethacrylate, poly-alkylene glycol (meth)acrylates, unsaturated sulfonic acids, for example acrylamidopropanesulfonic acid;

acrylamide, methacrylamide, ethacrylamide, N-methylacrylamide, N,N-dimethylacrylamide, N-ethylacrylamide, N-isopropylacrylamide, N-butylacrylamide, N-t-butylacrylamide, N-octylacrylamide, N-t-octylacrylamide, N-octadecylacrylamide, N-phenylacrylamide, N-methylmethacrylamide, N-ethylmethacrylamide, N-dodecylmethacrylamide, 1-vinylimidazole, 1-vinyl-2-methylimidazole, N,N-dimethylaminomethyl (meth)acrylate, N,N-diethylaminomethyl (meth)acrylate, N,N-dimethylaminoethyl (meth)acrylate, N,N-diethylaminoethyl (meth)acrylate, N,N-dimethylaminobutyl (meth)acrylate, N,N-diethylaminobutyl (meth)acrylate, N,N-dimethylaminohexyl (meth)acrylate, N,N-dimethylaminooctyl (meth)acrylate, N,N-dimethylaminododecyl (meth)acrylate, N-[3-(dimethylamino)propyl]methacrylamide, N-[3-(dimethylamino)propyl]acrylamide, N-[3-(dimethylamino)butyl]methacrylamide, N-[8-(dimethylamino)octyl]methacrylamide, N-[12-(dimethylamino)dodecyl]methacrylamide, N-[3-(diethylamino)propyl]methacrylamide, N-[3-(diethylamino)propyl]acrylamide;

diallyldimethylammonium chloride, vinyl ethers (for example: methyl-, ethyl-, butyl-, or dodecyl vinyl ethers), vinylformamide, vinylmethylacetamide, vinylamine; methyl vinyl ketone, maleimide, vinylpyridine, vinylimidazole, vinylfuran, styrene, styrenesulfonate, allyl alcohol, and mixtures thereof.

Of these, particular preference is given to methyl acrylate, methyl methacrylate, ethyl acrylate, ethyl methacrylate, n-butyl acrylate, n-butyl methacrylate, t-butyl acrylate, t-butyl methacrylate, isobutyl acrylate, isobutyl methacrylate, 2-ethylhexyl acrylate, N-t-butylacrylamide, N-octylacrylamide, 2-hydroxyethyl acrylate, hydroxypropyl acrylates, 2-hydroxyethyl methacrylate, hydroxypropyl methacrylates, alkylene glycol (meth)acrylates, unsaturated sulfonic acids, for example acrylamidopropanesulfonic acid, vinylpyrrolidone, vinylcaprolactam, vinyl ethers (e.g.: methyl, ethyl, butyl, or dodecyl vinyl ether), vinylformamide, vinylmethylacetamide, vinylamine, 1-vinylimidazole, 1-vinyl-2-methylimidazole, N,N-dimethylaminomethyl methacrylate and N-[3-(dimethylamino)propyl]methacrylamide; 3-methyl-1-vinylimidazolium chloride, 3-methyl-1-vinylimidazolium methylsulfate, N,N-dimethylaminoethyl methacrylate, N-[3-(dimethylamino)propyl]methacrylamide quaternized with methyl chloride, methyl sulfate or diethyl sulfate.

Monomers with a basic nitrogen atom can be quaternized in the following manner:

Examples of compounds suitable for quaternizing the amines are alkyl halides with 1 to 24 carbon atoms in the alkyl group, e.g. methyl chloride, methyl bromide, methyl iodide, ethyl chloride, ethyl bromide, propyl chloride, hexyl chloride, dodecyl chloride, lauryl chloride and benzyl halides, in particular benzyl chloride and benzyl bromide. Other suitable quaternizing agents are dialkyl sulfates, in particular dimethyl sulfate or diethyl sulfate. The quaternization of the basic amines can also be carried out with alkylene oxides, such as ethylene oxide or propylene oxide, in the presence of acids. Preferred quaternizing agents are: methyl chloride, dimethyl sulfate or diethyl sulfate.

The quaternization can be carried out before or after polymerization.

In addition, the reaction products of unsaturated acids, for example acrylic acid or methacrylic acid with a quaternized epichlorohydrin of the formula (V) ($R^{18}$=C1 to C40 alkyl) can be used.

Examples thereof are, for example:

(meth)acryloyloxyhydroxypropyltrimethylammonium chloride and
(meth)acryloyloxyhydroxypropyltriethylammonium chloride.

The basic monomers can also be cationized, by neutralizing them with mineral acids, for example sulfuric acid, hydrochloric acid, hydrobromic acid, hydroiodic acid, phosphoric acid or nitric acid, or with organic acids, for example formic acid, acetic acid, lactic acid, or citric acid.

In addition to the abovementioned monomers, monomers (a) which can be used are so-called macromonomers such as silicone-containing macromonomers having one or more free-radical polymerizable groups or alkyloxazoline macromonomers, as are described, for example, in EP 408 311.

In addition, chlorine-containing monomers, as are described, for example, in EP 558423, crosslinking compounds or compounds regulating the molecular weight can be used in combination or alone.

Regulators which can be used are the customary compounds known to the person skilled in the art, for example sulfur compounds (e.g.: mercaptoethanol, 2-ethylhexyl thioglycolate, thioglycolic acid or dodecylmercaptan) and also tribromochloromethane or other compounds which have a regulating effect on the molecular weight of the polymers obtained.

Where appropriate, it is also possible to use thio-containing silicone compounds.

Preference is given to using silicone-free regulators.

During the polymerization of monomers (a), it is also possible, where appropriate, for other polymers to be present, for example polyamides, polyurethanes, polyesters, homo- and copolymers of ethylenically unsaturated monomers. Examples of such polymers, some of which are also used in cosmetics, are the polymers known under the tradenames Amerhold™, Ultrahold 8™, Ultrahold Strong™, Luviflex™ VBM, Luvimer™ 100, Luvimer™ 36D, Luvimer™ MAE 30D, Acronal™ 500D, Acudyne™ 255, Stepanhold™, Lovocryl™, Versatyl™, Amphomer™ or Eastma AQ™.

These and other polymers can also be mixed into the polymer preparations according to the invention after polymerization.

The monomers A according to the invention can, provided they contain ionizable groups, be neutralized, partially or completely, using acids or bases, before or after polymerization in order, for example, to adjust the solubility or dispersibility in water to a desired level.

The neutralizing agents which can be used for monomers carrying cationizable groups are, for example, mineral acids such as hydrochloric acid, sulfuric acid or phosphoric acid, and also organic acids, such as carboxylic acids, lactic acid, citric acid, etc.

Furthermore, it is possible for the following to be present during the polymerization and/or added after the polymerization: auxiliaries such as plasticizers, film-forming auxiliaries, pigment, perfume or other auxiliaries, alone or in combination.

Suitable crosslinking agents (monomers (b)) are, for example, acrylic esters, methacrylic esters, allyl ethers or vinyl ethers of at least dihydric alcohols. The OH groups of the parent alcohols can be partially or completely etherified or esterified, however, the crosslinking agents contain at least two ethylenically unsaturated groups.

Examples of the parent alcohols are dihydric alcohols, such as 1,2-ethanediol, 1,2-propanediol, 1,3-butanediol, 2,3-butanediol, 1,4-butanediol, but-2-ene-1,4-diol, 1,2-pentanediol, 1,5-pentanediol, 1,2-hexanediol, 1,5-hexanediol, 1,10-decanediol, 1,2-dodecanediol, 1,12-dodecanediol, neopentyl glycol, 3-methylpentane-1,5-diol, 2,5-dodecanediol, 2,5-dimethyl-1,3-hexanediol, 2,2,4-trimethyl-1,3-pentanediol, 1,2-cyclohexanediol, 1,4-cyclohexanediol, 1,4-bis(hydroxymethyl)cyclohexane, mono(neopentyl glycol) hydroxypivalate, 2,2-bis(4-hydroxyphenyl)propane, 2,2-bis[4-(2-hydroxypropyl)phenyl]propane, diethylene glycol, triethylene glycol, tetraethylene glycol, dipropylene glycol, tripropylene glycol, tetrapropylene glycol, 3-thiopentane-1,5-diol, and also polyethylene glycols, polypropylene glycols and polytetrahydrofurans having molecular weights of in each case 200 to 10,000. As well as the homopolymers of ethylene oxide or propylene oxide, it is also possible to use block copolymers of ethylene oxide or propylene oxide or copolymers which contain incorporated ethylene oxide and propylene oxide groups. Examples of parent alcohols having more than two OH groups are trimethylolpropane, glycerol, pentaerythritol, 1,2,5-pentanetriol, 1,2,6-hexanetriol, triethoxycyanuric acid, sorbitan, sugar such as sucrose, glucose, mannose. The polyhydric alcohols can of course also be used following reaction with ethylene oxide or propylene oxide as the corresponding ethoxylates or propoxylates. The polyhydric alcohols can also be firstly converted into the corresponding glycidyl ethers by reaction with epichlorohydrin.

Other suitable crosslinking agents are the vinyl esters or the esters of monohydric, unsaturated alcohols with ethylenically unsaturated $C_3$–$C_6$-carboxylic acids, for example acrylic acid, methacrylic acid, itaconic acid, maleic acid or fumaric acid. Examples of such alcohols are allyl alcohol, 1-buten-3-ol, 5-hexen-1-ol, 1-octen-3-ol, 9-decen-1-ol, dicyclopentenyl alcohol, 10-undecen-1-ol, cinnamic alcohol, citronellol, crotyl alcohol or cis-9-octadecen-1-ol. It is, however, also possible to esterify the monohydric, unsaturated alcohols with polyhydric carboxylic acids, for example malonic acid, tartaric acid, trimellitic acid, phthalic acid, terephthalic acid, citric acid or succinic acid.

Esters of unsaturated carboxylic acids with the above-described polyhydric alcohols, for example oleic acid, crotonic acid, cinnamic acid or 10-undecenoic acid, can also be used as crosslinking agents.

Also suitable are straight-chain or branched, linear or cyclic, aliphatic or aromatic hydrocarbons which have at least two double bonds, which, in the case of aliphatic hydrocarbons, must not be conjugated, e.g. divinylbenzene, divinyltoluene, 1,7-octadiene, 1,9-decadiene, 4-vinyl-1-cyclohexene, trivinylcyclohexane or polybutadienes having molecular weights of 200 to 20,000.

Other suitable crosslinking agents are acrylamides, methacrylamides and N-allylamines of at least difunctional amines. Such amines are, for example, 1,2-diaminomethane, 1,2-diaminoethane, 1,3-diaminopropane, 1,4-diaminobutane, 1,6-diaminohexane, 1,12-dodecanediamine, piperazine, diethylenetriamine or isophoronediamine. Also suitable are the amides of allylamine and unsaturated carboxylic acids such as acrylic acid, methacrylic acid, itaconic acid, maleic acid, or at least dihydric carboxylic acids, as have been described above.

Also, triallylamine and triallylmonoalkylammonium salts, e.g. triallylmethylammonium chloride or methylsulfate, are suitable as crosslinking agents.

Also suitable are N-vinyl compounds of urea derivatives, at least difunctional amides, cyanurates or urethanes, for example of urea, ethyleneurea, propyleneurea or tartramide, e.g. N,N'-divinylethyleneurea or N,N'-divinylpropyleneurea.

Also suitable are alkylenebisacrylamides, such as methylenebisacrylamide and N,N'-(2,2-)butane and 1,1'-bis(3,3'-vinylbenzimidazolith-2-one)-1,4-butane.

Other suitable crosslinking agents are, for example, alkylene glycol di(meth)acrylates, such as ethylene glycol diacrylate, ethylene glycol dimethacrylate, tetraethylene glycol acrylate, tetraethylene glycol dimethacrylate, diethylene glycol acrylate, diethylene glycol methacrylate, vinyl acrylate, allyl acrylate, allyl methacrylate, divinyldioxane, pentaerythritol triallyl ether and mixtures of the crosslinking agents.

Other suitable crosslinking agents are divinyldioxane, tetraallylsilane or tetravinylsilane.

Particularly preferred crosslinking agents are, for example, methylenebisacrylamide, triallylamine and triallylalkylammonium salts, divinylimidazole, N,N'-divinylethyleneurea, reaction products of polyhydric alcohols with acrylic acid or methacrylic acid, methacrylic esters and acrylic esters of polyalkylene oxides or polyhydric alcohols which have been reacted with ethylene oxide and/or propylene oxide and/or epichlorohydrin. Very particularly preferred crosslinking agents are methylene-bisacrylamide, N,N-divinylethylene urea and acrylic esters of glycol, butanediol, trimethylolpropane or glycerol, or acrylic esters of butanediol, trimethylolpropane, glycerol or glycol reacted with ethylene oxide and/or epichlorohydrin.

The crosslinking agent is preferably soluble in the reaction medium. If the solubility of the crosslinking agent in the reaction medium is low, it can be added dissolved in a monomer or in a monomer mixture or else dissolved in a solvent miscible with the reaction medium. Particular preference is given to those crosslinking agents which are soluble in the monomer mixture.

The content of the crosslinking agents can highly influence the solution viscosity of the polymers according to the invention.

The steric stabilizer functions to provide a steric barrier which repulses approaching particles. A requirement for the steric stabilizer is that a segment of the dispersant (i.e., a hydrophobe) be very soluble in the solvent (the continuous phase in a nonaqueous dispersion polymerization process) and that another segment (i.e., a hydrophile) be at least strongly adhered to the growing polymer particle. Thus, the steric stabilizers of the present invention have a hydrophilic group and a hydrophobic group. The steric stabilizers are block copolymers comprising a soluble block and an anchor block having a molecular weight (i,e., chain length) usually well above 1000, but a hydrophobe length of more than 5 nm (50 Angstroms), as calculated by the Law of Cosines. These dimensions are determined on the extended configuration using literature values for bond lengths and angles. Thus the steric stabilizers of the present invention are distinguishable from the prior art steric surfactants which may be block copolymers, but have hydrophobe lengths of less than 5 nm (50 Angstroms). The steric stabilizer of the present invention has either a linear block or a comb configuration, and has a hydrophobe of sufficient length to provide a sufficient steric barrier.

When the steric stabilizer is a linear block copolymeric steric stabilizer, it is defined as linear block copolymer, having a hydrophobic moiety having a length of more than 5 nm (50 Angstroms) (as calculated by the Law of Cosines) and being defined by the following formula

wherein
A is a hydrophilic moiety having a solubility in water at 25° C. of 1% or greater, a molecular weight of from 200 to 50,000, and selected to be covalently bonded to B;
B is a hydrophobic moiety having a molecular weight of from 300 to 60,000, a solubility of less than 1% in water at 25° C., capable of being covalently bonded to A;
C and D are terminating groups which can be A or B, can be the same or different groups, w is 0 or 1;
x is an integer of 1 or more,
y is 0 or 1, and
z is 0 or 1, Examples of hydrophilic groups are polyethylene oxide, poly(1,3-dioxolane), copolymers of polyethylene oxide or poly(1,3-dioxolane), poly(2-methyl-2-oxazoline polyglycidyl trimethylammonium chloride and polymethylene oxide, with polyethylene oxide being preferred. Examples of hydrophobic groups are polyesters, such as those derived from 2-hydroxybutyric acid, 3-hydroxybutyric acid, 4-hydroxybutyric acid, 2-hydroxycaproic acid, 10-hydroxydecenoic acid, 12-hydroxydodecanoic acid, 16-hydroxyhexadecanoic acid, 2-hydroxyisobutyric acid, 2-(4-hydroxyphenoxy)propionic acid, 4-hydroxyphenylpyruvic acid, 12-hydroxystearic acid, 2-hydroxyveleric acid, polylactones, such as caprolactone, butyrolactone, polylactams, such as those derived from caprolactam, polyurethanes, polyisobutylene, where the hydrophobe should provide a steric barrier of greater than 5 nm (50 Angstoms), preferably greater than 7.5 nm (75 Angstroms), with greater than 10 nm (100 Angstroms) being also preferred, with polyhydroxy fatty acids, such as poly (12-hydroxystearic acid) being preferred. The steric barrier is the length of the hydrophobe in its fully-extended state. Such steric stabilizers are commercially available under the brand name Hypermer (from Imperial Chemical Industries, Inc.)

Steric stabilizer molecules comprise both hydrophilic and hydrophobic units. Hydrophobic polymer units or hydrophobic blocks may be prepared by a number of well known methods. These methods include condensation reactions of hydroxy acids, condensation of polyols (preferably diols) with polycarboxylic acids (preferably diacids). Other useful methods include polymerization of lactones and lactams, and reactions of polyols with polyisocyanates. Hydrophobic blocks or polymer units can be reacted with hydrophilic units by such reactions as are known to those skilled in the art. These reactions include condensation reactions and coupling reactions, for example. Subsequent to the steric stabilizer preparation, the stabilizers may be further reacted with modifying agents to enhance their utility. U.S. Pat. No. 4,203,877 to Alan S. Baker teaches making such steric stabilizers, and the entire disclosure thereof is incorporated herein by reference.

When the steric stabilizer is a random copolymeric comb steric stabilizer, it is defined as random copolymer, being defined by the following formula:

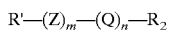

where
R2 is a terminating group different from Z and Q,
Z is a hydrophobic moiety having a solubility of less than 1% in water at 25° C.,
Q is a hydrophilic moiety, having a sulubility of more than 1% in water at 25° C., and
m and n are integers of 1 or more, and are selected such that the molecular weight is from 100 to 250,000.

Examples of the hydrophobic monomer unit or moiety are dimethy-siloxane, diphenylsiloxane, methylphenylsiloxane, alkyl acrylate and alkyl methacrylate, with dimethylsiloxane phosphate being preferred.

Examples of the hydrophobic monomer unit or moiety are methyl-3-polyethoxypropylsiloxane n-phosphate or sulfate, and the alkali metal or ammonium salts derived therefrom; units derived from polyethoxy (meth)acrylate containing from 1 to 40 moles of ethylene oxide; acrylic acid; acrylamide; methacrylic acid, maleic anhydride; dimethylamino-ethyl (meth)acrylate; or its salts with methyl chloride or dimethyl sulfate; dimethylaminopropyl (meth)acrylamide and its salts with methyl chloride or dimethyl sulfate, with methyl-3-polyethoxypropylsiloxane (-phosphate being preferred.

The steric stabilizer may also be used in combination with other surfactants. The amount of steric stabilizing surfactant used in an amount of between 0.01 to 10% is preferred, and 0.2 to 6.0% is further preferred, based upon the weight of the olefinically unsaturated carboxylic acids or anhydrides, to be polymerized.

Examples of terminating agents are monohalo silanes, mercaptans, haloalkanes, alkyl aromatics and alcohols, which will produce terminating groups such as trialkylsilyl, alkyl, arylalkyl and alcoholate, with the preferred terminating groups being trimethylsilyl.

An example of a random copolymeric comb steric stabilizer is a dimethicone copolyol phosphate which is disclosed in EP 584 771:

As noted earlier, the steric stabilizers of the appropriate structure in accordance with the present invention have the potential for becoming part of a (meth)acrylic acid or anhydride-containing polymer as an interpolymer by several mechanism theory, its explanation is felt to be helpful in understanding the invention.

In the graft-type mechanism, an abstractable hydrogen is removed from the stabilizer. The radical thus formed reacts with a growing polymer radical forming a covalent bond with a stabilizer containing a poly(ethylene oxide) (PEO) segment, abstraction is reasonably postulated to occur (- to the ether oxygen, although other sites are possible. Further details are disclosed in EP 584 771.

What is claimed is:

1. An interpolymer of
   (1)
   (a) at least one olefinically unsaturated monomer without carboxylic groups containing at least one activated carbon-to-carbon olefinic double bond and
   (b) 0.001 to 10% by weight of a crosslinking monomer being different from (a) having at least two ethylenically unsaturated crosslinking monomers, and
   (2) 0.001 to 20% by weight based upon the weight of the monomers (a) of at least one steric stabilizer having at least one hydrophilic moiety and at least one hydrophobic moiety, selected from the group consisting of linear block copolymeric steric stabilizers, having a hydrophobic moiety having a length of more than 5 nm and being defined by the following formula:

wherein
A is a hydrophilic moiety having a solubility in water at 25° C. of 1% or greater, a molecular weight of from 200 to 50,000, and selected to be covalently bonded to B;
B is a hydrophobic moiety having a molecular weight of from 300 to 60,000, a solubility of less than 1% in water at 25° C., capable of being covalently bonded to A;
C and D are terminating groups which can be A or B, can be the same or different groups,
w is 0 or 1;
x is an integer of 1 or more,
y is 0 or 1, and
z is 0 or 1,
random copolymeric comb steric stabilizers, being defined by the following formula:

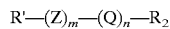

where
R' and R2 are terminating groups and may be the same or different and will be different from Z and Q,
Z is a hydrophobic moiety having a solubility of less than 1% in water at 25° C.,
Q is a hydrophilic moiety, having a solubility of more than 1% in water at 25° C., and
m and n are integers of 1 or more, and are selected such that the molecular weight is from 100 to 250,000, and
mixtures thereof.

2. The interpolymer of claim 1 wherein said steric stabilizer is present in an amount of 0.01 to 10% by weight based upon the weight of monomers.

3. The interpolymer of claim 1 wherein said steric stabilizer is present in an amount of 0.2 to 6.0% by weight based upon the weight of said monomers.

4. The interpolymer of claim 1 wherein said block copolymer is a block copolymer of 12-hydroxystearic acid.

5. The interpolymer of claim 4 wherein said polymer of 12-hydroxystearic acid is a block copolymer with polyethylene oxide.

6. The interpolymer of claim 4 wherein said polymer of 12-hydroxystearic acid is an ABA block copolymer.

* * * * *